United States Patent
Wolman et al.

(10) Patent No.: US 7,283,834 B2
(45) Date of Patent: *Oct. 16, 2007

(54) MULTI-RADIO UNIFICATION PROTOCOL

(75) Inventors: Alastair Wolman, Seattle, WA (US);
Atul Adya, Redmond, WA (US);
Paramvir Bahl, Sammamish, WA (US);
Jitendra D. Padhye, Kirkland, WA (US); Lidong Zhou, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/361,126

(22) Filed: Feb. 24, 2006

(65) Prior Publication Data

US 2006/0142033 A1    Jun. 29, 2006

Related U.S. Application Data

(63) Continuation of application No. 10/723,673, filed on Nov. 26, 2003, now Pat. No. 7,065,376.

(60) Provisional application No. 60/456,128, filed on Mar. 20, 2003.

(51) Int. Cl.
*H04B 7/00* (2006.01)

(52) U.S. Cl. .............. 455/517; 455/516; 455/513; 455/514; 455/515; 370/320; 370/334; 370/332; 370/310; 370/345

(58) Field of Classification Search ............... 455/517, 455/516, 513, 514, 515; 370/320, 334, 332, 370/310, 345
See application file for complete search history.

(56) References Cited

U.S. PATENT DOCUMENTS

| 6,694,147 B1 | 2/2004 | Viswanath et al. |
| 6,917,311 B2 | 7/2005 | Hosur et al. |
| 2002/0085516 A1 | 7/2002 | Bridgelall |
| 2003/0174690 A1* | 9/2003 | Benveniste ............... 370/350 |

(Continued)

OTHER PUBLICATIONS

Adya, et al., "A Multi-Radio Unification Protocol for IEEE 802.11 Wireless Networks," Microsoft Research Technical Report MSR-TR-2033-44, Redmond, WA, Microsoft Corp., Jul. 2003.

(Continued)

*Primary Examiner*—Rafael Pérez-Gutirrez
*Assistant Examiner*—Khai Nguyen
(74) *Attorney, Agent, or Firm*—Wolf, Greenfield & Sacks, P.C.

(57) ABSTRACT

An invention is disclosed whereby a wireless network node, equipped with two or more radio transceivers statically tuned to non-interfering frequency channels, can make decisions regarding which channel to use when communicating with a neighboring wireless node. A multi-radio unification protocol implemented in a wireless node coordinates the use of multiple wireless network interface cards and provides a virtual layer that hides the multiple physical network interfaces from higher layers of a node's network protocol stack. The invention is applicable to wireless networks generally, including those in which some nodes do not have multiple radios or do not recognize the multi-radio unification protocol. The invention makes possible simultaneous transmissions using available channels, thereby reducing interference and delay while increasing the overall capacity of the network.

16 Claims, 9 Drawing Sheets

U.S. PATENT DOCUMENTS

| | | | |
|---|---|---|---|
| 2003/0203740 A1 | 10/2003 | Bahl et al. | |
| 2004/0039817 A1* | 2/2004 | Lee et al. | 709/225 |
| 2004/0042421 A1 | 3/2004 | Mahany | |
| 2004/0156339 A1* | 8/2004 | Urquhart et al. | 370/334 |
| 2004/0233839 A1 | 11/2004 | Troulis | |
| 2005/0176473 A1 | 8/2005 | Melpignano | |

OTHER PUBLICATIONS

"*Wireless LAN For Enterprises: There Are A Myriad of Wireless LAN Standards, Each With Limitations When It Comes To Creating A Network Free From Cable.*" In: Alacatel Telecommunications Review. Journalbeitrag, Oct. 2002. Alcatel, Paris Cedex, Frankeich. ISSN 1267-7167, pp. 1-8.

Garcia-Luna-Aceves, J.J.; Tzamaloukas, A; "*The Effect Of Exerting Adequate Persistence In Collision Avoidance Protocols.*" In: IEEE International Workshop On Mobile Multimedia Communications, 1999. (MoMuC '99). San Diego, CA, 15-17. Nov. 1999. pp. 328-337.

Austrian Search Report from a corresponding International or Foreign National Application, no date.

* cited by examiner

NEIGHBOR TABLE ENTRY

MULTI-RADIO UNIFICATION PROTOCOL

CROSS-REFERENCE TO RELATED APPLICATIONS

This invention is a continuation of U.S. patent application Ser. No. 10/723,673, filed on Nov. 26, 2003, now U.S. Pat. No. 7,065,376 which claims priority to U.S. Provisional Patent Application Ser. No. 60/456,128, filed on Mar. 20, 2003, which are hereby incorporated in their entirety by reference.

TECHNICAL FIELD OF THE INVENTION

The present invention relates generally to wireless networks, and more particularly to wireless networks in which one or more network nodes are equipped with more than one radio transceiver.

BACKGROUND OF THE INVENTION

Wireless data communication networks, such as those comprising devices conformant to IEEE 802.11 standards, generally feature nodes equipped with a single wireless LAN (WLAN) card containing a single radio transceiver. The performance scalability of multi-hop IEEE 802.11 WLANs has been limited by low network capacity. End-to-end throughput decreases as node density and the number of network hops increases. Low capacity has been an obstacle in the deployment of such networks, despite their many beneficial uses. For example, wireless community mesh networks allow neighbors to share a fast and inexpensive Internet gateway and to take advantage of locally-distributed applications, data and storage.

There are many factors that contribute to the poor scalability of multi-hop IEEE 802.11 wireless LANs. One reason for the poor scalability of 802.11 multi-hop wireless networks is that a conventional WLAN radio cannot transmit and receive data at the same time. This particularly limits scalability in multi-hop networks, in which a node may act to forward data from a source node to a destination node. In such a network the capacity of nodes that forward data is half of what it would be if simultaneous reception and transmission were possible.

In 802.11-conformant wireless networks, scalability is further limited by the use of suboptimal backoff algorithms in both Medium Access Control (MAC) and transport-layer protocols. Additionally, 802.11-compliant WLAN radios do not use the entire available frequency spectrum, operating instead over a small portion of the spectrum (a "channel"). Although multiple non-interfering ("orthogonal") channels are available, the 802.11 physical (PHY) layer is designed to use only a single channel at any given time. Furthermore, in 802.11 ad hoc networks scalability is limited because all nodes in a given LAN operate on the same channel.

Yet another limit to scalability is caused by the way in which the 802.11 MAC handles the hidden terminal problem. Under the 802.11 MAC specification, a data transmission is preceded by an exchange of Request to Send (RTS) and Clear to Send (CTS) frames. All nodes that are within range of either the sender or the receiver are required to be silent during the data transmission. Similar conditions are present under most other proposed and implemented wireless network MAC protocols to combat the hidden terminal problem.

In infrastructure-based WLANs, additional network capacity can be obtained by dividing the physical space into "cells" and operating neighboring cells on orthogonal channels. Such a solution is inapplicable to multi-hop wireless networks, however. If a first wireless node chooses a channel that is orthogonal to the channel chosen by one of its neighbors, then these neighboring nodes will not be able to communicate with one another. (In this specification and in the accompanying claims, unless context indicates otherwise, a first node is a neighbor node or neighboring node with respect to a second node if the first node is within communicating range of one or more transceivers located on the second node.)

Dynamic channel-switching by single-radio nodes is not yet a practical solution to the capacity problem. Under the current state of the art, dynamic channel switching could reintroduce the hidden terminal problem: a node might miss an RTS/CTS exchange on one channel while listening on another channel. The introduction of dynamic switching necessitates some means of coordinating communication nodes with respect to a common channel. Such coordination is difficult to achieve without another communication channel or over-restrictive pre-negotiated schedules. Moreover, the delay associated with switching channels tends to be on the order of hundreds of milliseconds, which would itself lead to a substantial degradation in performance. Another relatively impractical solution is to design a new MAC protocol. This would require extensive changes to existing WLAN standards and the development of new hardware. Multi-hop wireless networks therefore have generally operated on the basis of one radio per node and one channel per node, limiting the achievable bandwidth for such networks.

The invention described herein enables a wireless network node to make full use of the available frequency spectrum by having two or more radios tuned to orthogonal channels. Striping is one possible approach to exploiting multiple radios per network node. However, proposals for the striping of network traffic over multiple network interfaces per network node do not provide a satisfactory solution to the capacity problems of wireless networks. Most striping proposals are designed for networks that can be assumed to be wired and single-hop. Striping proposals typically require changes to existing application, transport, and routing protocols. Some striping proposals are associated with worsened performance and reduced aggregate bandwidth. When striping is used with the TCP transport protocol, sending multiple packets of the same data stream over different channels increases the likelihood of out-of-order arrival of packets, which may be interpreted by TCP as a sign of packet loss, resulting in an adjustment of the TCP congestion window. Striping proposals generally do not work in networks that include heterogeneous nodes (some with multiple network interfaces and some with a single network interface card), a practical obstacle to incremental deployment.

SUMMARY OF THE INVENTION

The following presents a simplified summary of some embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is provided below.

In accordance with certain embodiments of the invention, a method is provided whereby a first wireless node, equipped with multiple radio transceivers tuned to orthogonal channels, selects one of the transceivers, and thus one of the channels, for communication to a neighboring second wireless node. The first node discovers the neighbor and obtains information concerning its available network interfaces. In accordance with one aspect of the invention, the first node may additionally determine whether the neighbor is itself capable of performing the same channel selection method for communication to the first node. The first node then periodically makes an estimate of the quality of each channel available for communication to the neighbor. Based on the channel quality estimates, the first node selects one of the channels and uses that channel for communication to the neighbor for a period of time. The first node may perform the method with respect to each of its neighboring nodes. In accordance with one embodiment of the invention, the first node may make estimates of channel quality based on a smoothed round-trip latency measurement.

In accordance with another aspect of the invention, a wireless network device, equipped with multiple radio transceivers tuned to mutually orthogonal channels, executes a driver whereby the device selects one of the transceivers, and thus one of the channels, for communication to a neighboring wireless device.

In accordance with another aspect of the invention, a wireless network node, equipped with multiple radios tuned to orthogonal channels, maintains a table for storing information pertaining to the selection of a channel for communication to a neighboring wireless network node based on estimates of the quality of each channel available for communication to the neighboring node. There is a separate entry in the table for each neighboring node.

In accordance with another aspect of the invention, a first device having two or more wireless network interface cards, and capable of engaging in wireless networked data communication with another device by way of a multilayered network protocol stack implemented in the first device, provides within the protocol stack a virtual layer hiding the existence of multiple network interfaces and exposing only a single network interface to higher layers of the protocol stack.

Other features of the invention will become apparent from the following detailed description when taken in conjunction with the accompanying drawings, in which:

DETAILED DESCRIPTION

Figure 1:
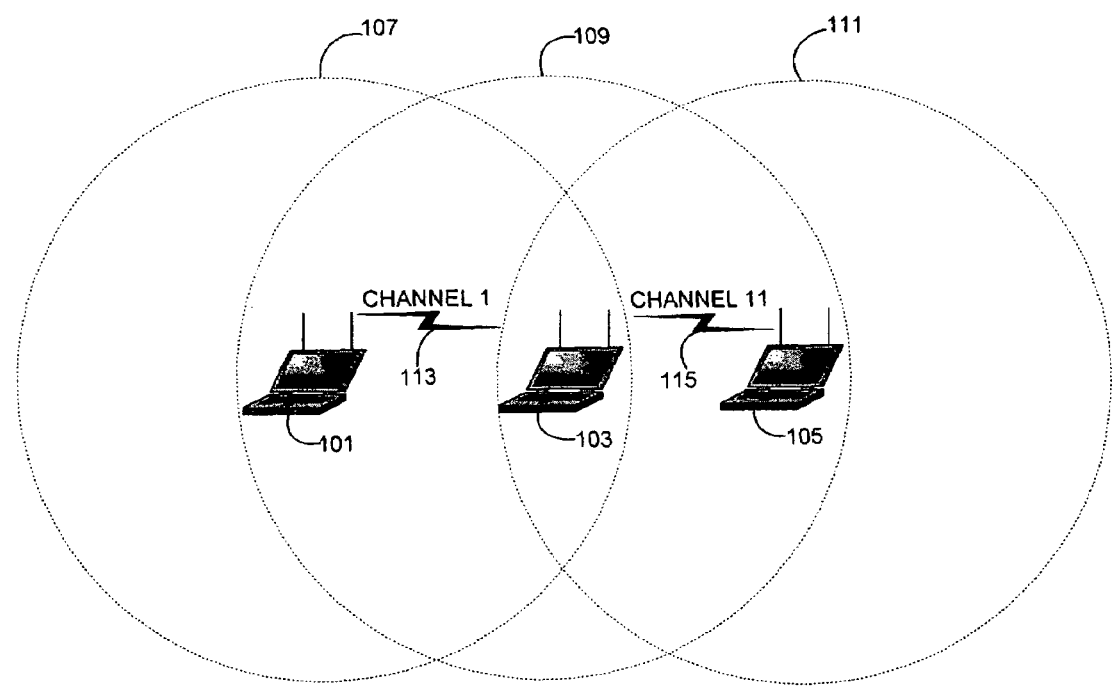
FIG. 1 is a diagram representing a simple exemplary wireless network within which an embodiment of the present invention may be incorporated.

In the following description, embodiments of the present invention will be described. For purposes of explanation, certain specific configurations and details are set forth in order to provide an adequate understanding of the embodiments. However, it will also be apparent to those skilled in the art that the present invention may be practiced without inclusion of those configurations and details. Furthermore, well-known features, and particularly features well-known to practitioners of ordinary skill in the computing and computer networking arts, may be omitted or simplified in order not to obscure the embodiment being described.

The invention described and claimed herein is not restricted to being practiced in a particular kind of wireless network. It is applicable to multi-hop wireless networks, ad hoc wireless networks, infrastructure wireless networks, wireless mesh networks, and other wireless networks. One or more nodes in the network may be additionally connected to another network, including a wired network, and including a wide-area network, in which case a node within the wireless network may also function as a gateway to the other network. While the detailed description of embodiments of the invention set forth herein may make illustrative reference to wireless network devices conformant to IEEE 802.11 standards, the invention is not limited to wireless network nodes that use particular kinds of wireless network interface hardware and lower-layer network protocols and specifications, and the invention is not limited to hardware conformant to one or more existing wireless network standards.

The term "computer-readable medium," as used in this specification and its appended claims, includes any medium for storage of data capable of being read by a computing device, including a computing device functioning as a wireless network node. Examples of such computer-readable media include, without limitation, volatile and nonvolatile primary memory, removable and nonremovable magnetic disk storage, optical disk storage, and network communication media.

Embodiments of the invention are applicable to a wireless data communication network comprising a plurality of network nodes. A node in an exemplary wireless network may comprise a stationary, mobile or portable computing device connected to or including thereon one or more wireless network interface cards (NICs), such as an 802.11-conformant WLAN card. A wireless NIC conventionally has a unique physical address, such as a 48-bit 802.11 MAC address, and includes a radio transceiver for transmitting data to and receiving data from other wireless nodes. The invention is intended to be practiced within a wireless network in which one or more nodes are equipped with more than one wireless NIC. (For simplicity of explanation, throughout this specification, including the claims appended hereto, unless context indicates otherwise, "NIC, "network interface," "radio," and "transceiver" are treated as interchangeable terms.)

In accordance with the invention, a node in a wireless network is equipped with two or more wireless NICs tuned at startup to fixed assigned orthogonal channels. The following table shows the spectrum and channel structure of the 802.11a, 802.11b, and 8020.11g standards in the United States, along with the number of channels that are nominally orthogonal.

| Standard | Frequency Range (GHz) | Orthogonal Channels | Channel Width (MHz) |
|---|---|---|---|
| IEEE 802.11a | 5.15-5.35, 5.725-5.850 | 13 | 20 |
| IEEE 802.11b, g | 2.400-2.4835 | 3 | 22 |

In theory, radios that operate on non-overlapping channels should not interfere with each other. In practice, due to signal power leakage, radios that are physically close to each other, as in the case of a forwarding node with multiple radios in a multi-hop network, may interfere with one another even while operating on non-overlapping channels.

In accordance with the invention, a multiple-NIC node uses a protocol and associated methods and mechanisms whereby the node selects, at various points in time, a channel for communicating data to a particular neighbor node, the channel being that to which one of its NICs has been tuned. In one embodiment of the invention, the selection decision attempts to identify the channel with the lightest load among the set of channels available for communication to the neighbor, but the invention is applicable to other kinds of channel quality metrics.

FIG. 1 depicts a simple example of a wireless network within which aspects of the present invention may be incorporated. In such a wireless network, as well as in wireless networks with more complex topologies, the availability of multiple radios coupled with the possibility of simultaneous transmission and reception of data on noninterfering orthogonal channels, in accordance with the invention, can increase network capacity. A chain of three nodes 101, 103, 105 is shown. Each node may be assumed to have two NICs (not explicitly shown), each NIC including a radio. On each node, one radio is tuned to channel 1 and the other radio on each node is tuned to channel 11. It is assumed in this example that channels 1 and 11 are orthogonal and noninterfering. The overlapping broken-line circles 107, 109, 111 surrounding each node represent the wireless transmitting ranges of each node (for simplicity, it is assumed in this illustration that a node has a single range applicable to all of its radios). In the illustrated network it is assumed that each node can communicate only with its adjacent neighbor. Thus, node 103 is the only neighbor of node 101, node 103 is the only neighbor of node 105, and node 103 has two neighbors, nodes 101 and 105.

The network of FIG. 1 may be viewed as a simple case of a multi-hop ad hoc wireless network. Here the middle node 103 can serve as a forwarding node relaying packets between the two end nodes 101, 105. Two active wireless data transmissions are represented by the jagged lines 113, 115. One transmission occurs between the NICs on node 101 and node 103 that are tuned to channel 1, and the other transmission occurs between the NICs on node 103 and node 105 that are tuned to channel 11. The availability of multiple radios along with the present invention permits the transmissions to be simultaneous.

Figure 2:
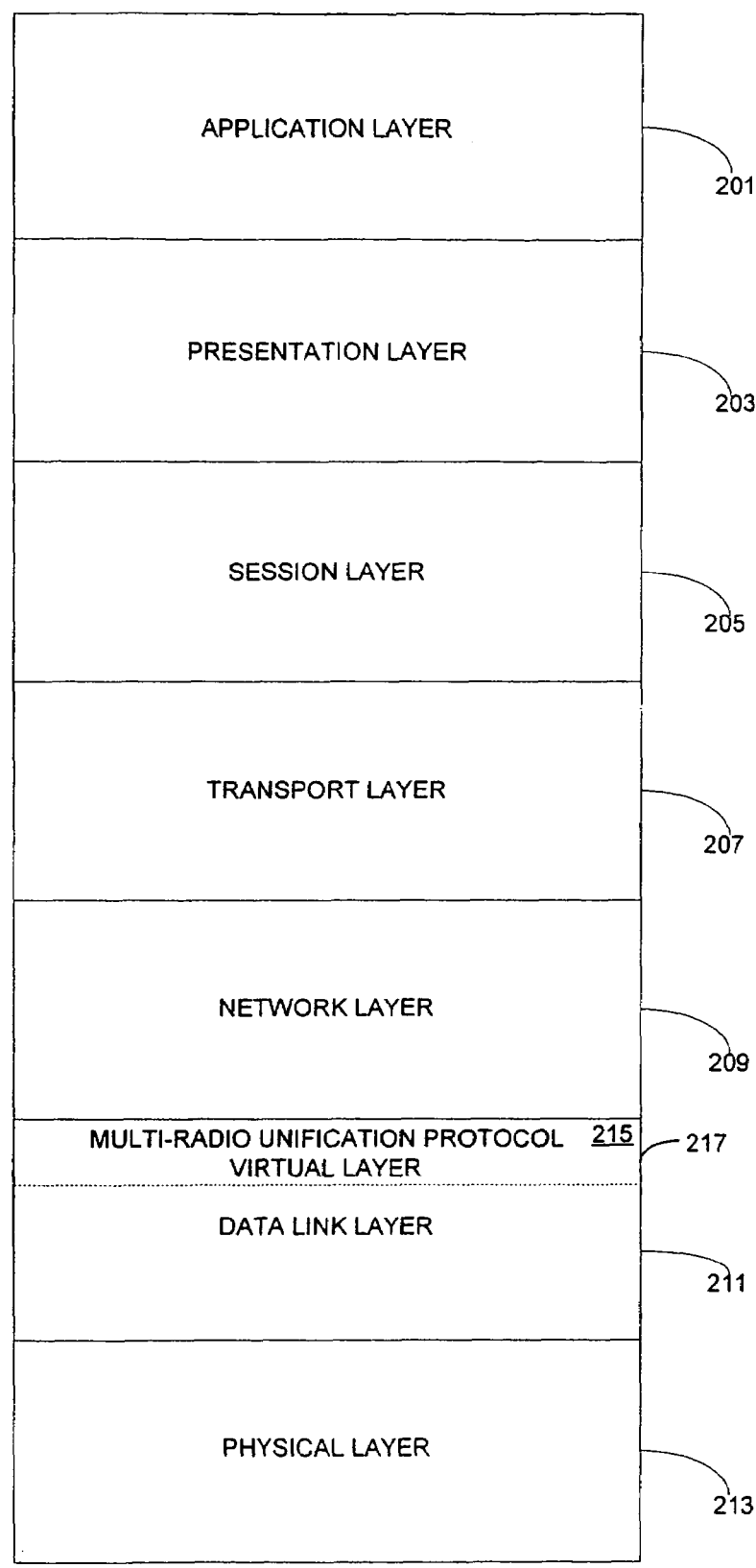
FIG. 2 is a diagram of an exemplary network protocol stack in a wireless network node within which an embodiment of the invention may be incorporated.

FIG. 2 provides a view of an embodiment of the invention as situated within a wireless network node having a network protocol stack. For illustrative purposes, the protocol stack depicted here conforms to the well-known OSI Reference Model. It will be recognized by those skilled in the art that the OSI model is conceptual in nature and that actual network nodes implement network protocol stacks that depart from the model in various ways. In the OSI model, networking protocols are situated within a hierarchy of seven logical layers: application 201, presentation 203, session 205, transport 207, network 209, data link 211, and physical 213. Units of data are passed across interfaces between the layers. As a data unit is passed down a source node from higher to lower layers it is successively encapsulated at each layer in accordance with protocols associated with that layer, and it is actually transmitted at the lowest layer. At the destination node it is passed up the layers and successively stripped of its encapsulating headers.

In accordance with an embodiment of the present invention, a multi-radio unification protocol 215 (hereinafter also referred to as "MUP") is situated within the data link layer 211 of the protocol stack. The multi-radio unification protocol 215 presents a virtual layer 217 to higher layers of the protocol stack, as will be explained below. In an embodiment of the invention, the multi-radio unification protocol 215 may be implemented as an intermediate layer between the data link layer 211 and the network layer 209.

Figure 3:
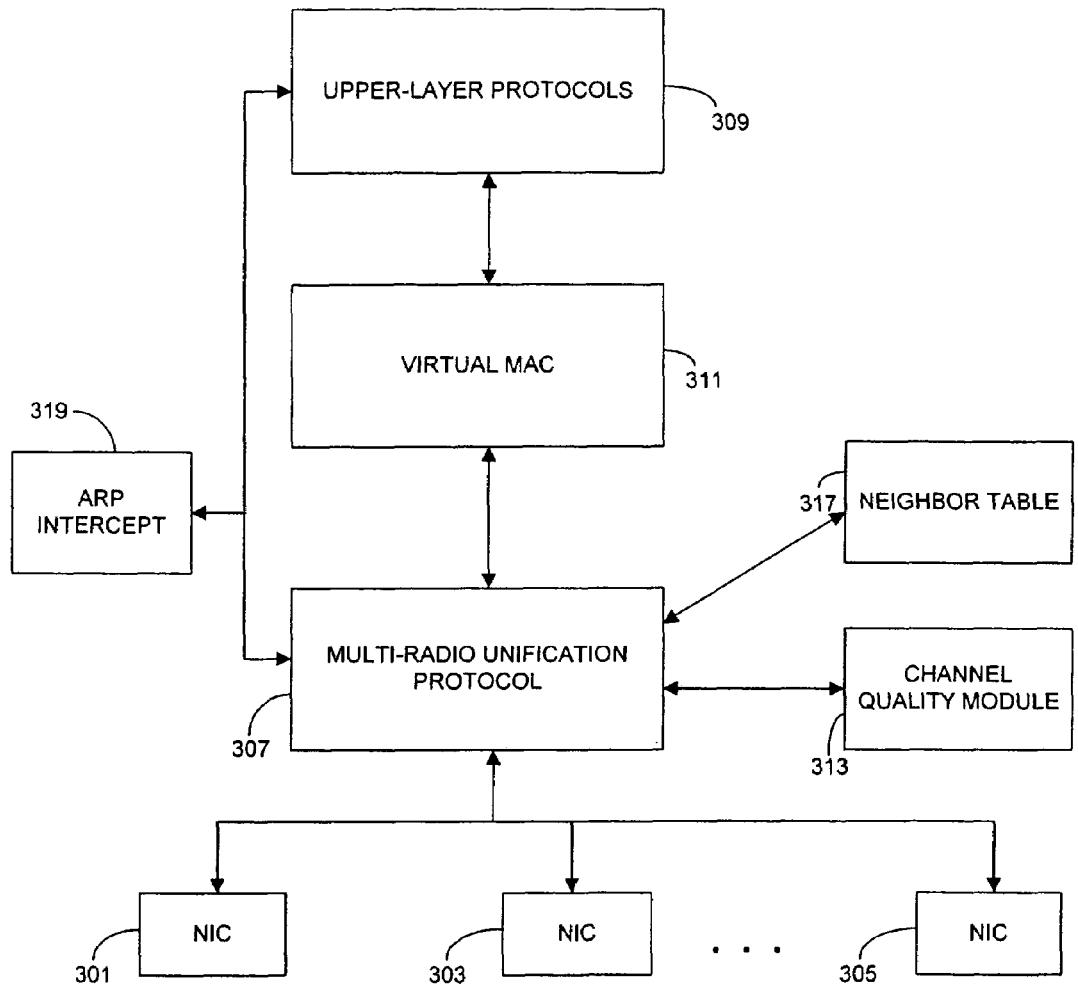
FIG. 3 is a diagram of the architecture of an embodiment of the invention situated within a wireless network node.

FIG. 3 provides a more detailed architectural view of an embodiment of the invention situated within a wireless network node. By way of example, it is here assumed that the node implements 802.11 or similar lower-level wireless networking protocols and supports one or more upper-layer network communication protocols 309, such as TCP/IP, NetBEUI, or IPX/SPX. The node is equipped with multiple wireless NICs 301, 303, 305. Above the several NICs is the multi-radio unification protocol 307, the main functionality of which is channel selection. In accordance with the invention, this protocol conceals the complexity of multiple NICs from higher layers of the protocol stack 309 by exposing a single virtual MAC interface 311 to these upper layers. With respect to TCP/IP, for example, the higher layers include IP, situated in FIG. 2 at the OSI networking layer 209, and layers above IP.

The multi-radio unification protocol 307 thus unifies multiple physical radios, thereby providing frequency diversity while ensuring that all nodes are part of the same logical network. A single virtual MAC address 311 hides the MAC addresses of the several NICs 301, 303, 305. In an embodiment of the invention, the virtual MAC address is a 48-bit address conformant to 802.11 MAC specifications. The multi-radio unification protocol performs multiplexing of packets passing down the network protocol stack so that they may be transmitted along an appropriate network interface, and it merges received packets before passing them up the protocol stack. From the perspective of the application, the node operates as if there is only one wireless network interface. This design allows network traffic to make use of the multiple network interfaces without requiring any modification to network applications or upper-layer application, transport, and routing protocols.

A wireless node using the multi-radio unification protocol maintains a neighbor table 317 with an entry for each neighboring node. The table stores information about neighbors with which the node has communicated, including whether the neighbor is itself MUP-enabled. The table also stores the unique address associated with each of a neighbor's network interfaces, as well as the corresponding channel quality and channel selection information.

Figure 4:
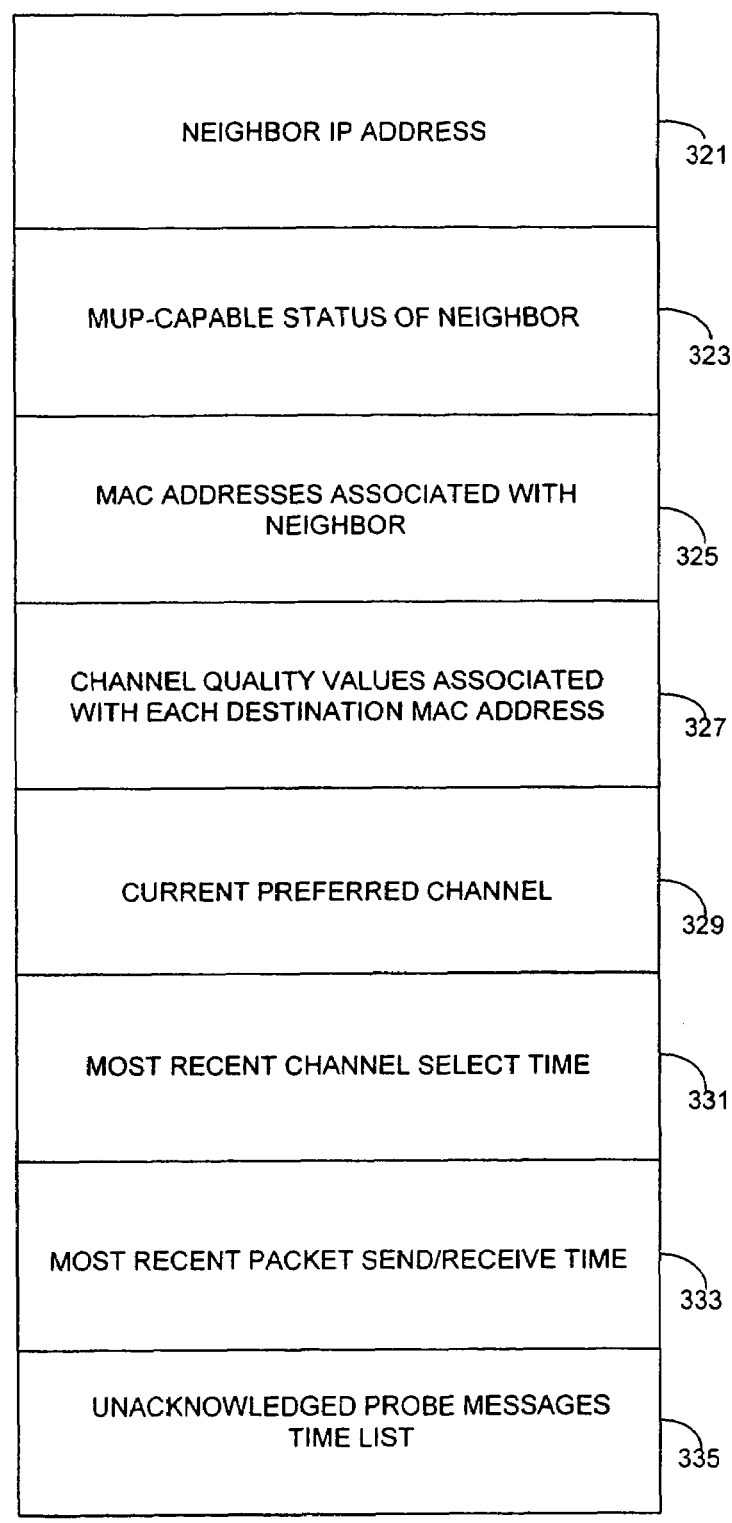
FIG. 4 is a block diagram representing the fields of a neighbor table entry in an embodiment of the invention.

FIG. 4 shows an example of the data fields that a neighbor table entry may contain in an embodiment of the invention. The depicted order of these fields is for exemplary purposes only, and those having skill in the art will readily recognize that the neighbor table can have alternate formats, including other orderings of the component data fields. A first field 321 holds the IP address of the neighbor. In another embodiment this field may hold another unique identifier associated with the neighbor node, such as a Domain Name Service (DNS) name.

A second field 323 is used for indicating whether the neighbor understands the multi-radio unification protocol. The invention is not restricted to being practiced in a wireless network in which all nodes are equipped with multiple radios and in which all nodes are capable of communicating in accordance with MUP. The invention may be practiced in a wireless network in which some nodes are legacy nodes (nodes with only a single wireless NIC or which otherwise do not operate in accordance with the multi-radio unification protocol). This feature of the invention permits incremental deployment in a wireless network.

A third field 325 in the neighbor table entry holds the set of individual MAC addresses associated with each of the neighbor node's network interfaces. A fourth field 327 holds the set of channel quality values, which will be explained in further detail below. A fifth field 329 holds the actual channel that is currently selected for communicating with the neighbor. A sixth field 331 holds the most recent time at which a channel selection decision has been made. A seventh field 333 holds the most recent time at which a packet was sent to or received from this neighbor. An eighth field 335 contains, for each of the neighbor's network interfaces, the most recent time at which an unacknowledged probe message was transmitted. The use of probe messages in accordance with the invention will be explained in further detail below. If a response to the unacknowledged probe is later received, the probe round-trip time can be calculated based on the information in the eighth field 335; the probe transmission time can also be used along with a timeout threshold to determine whether a probe message has been lost.

Figure 5:
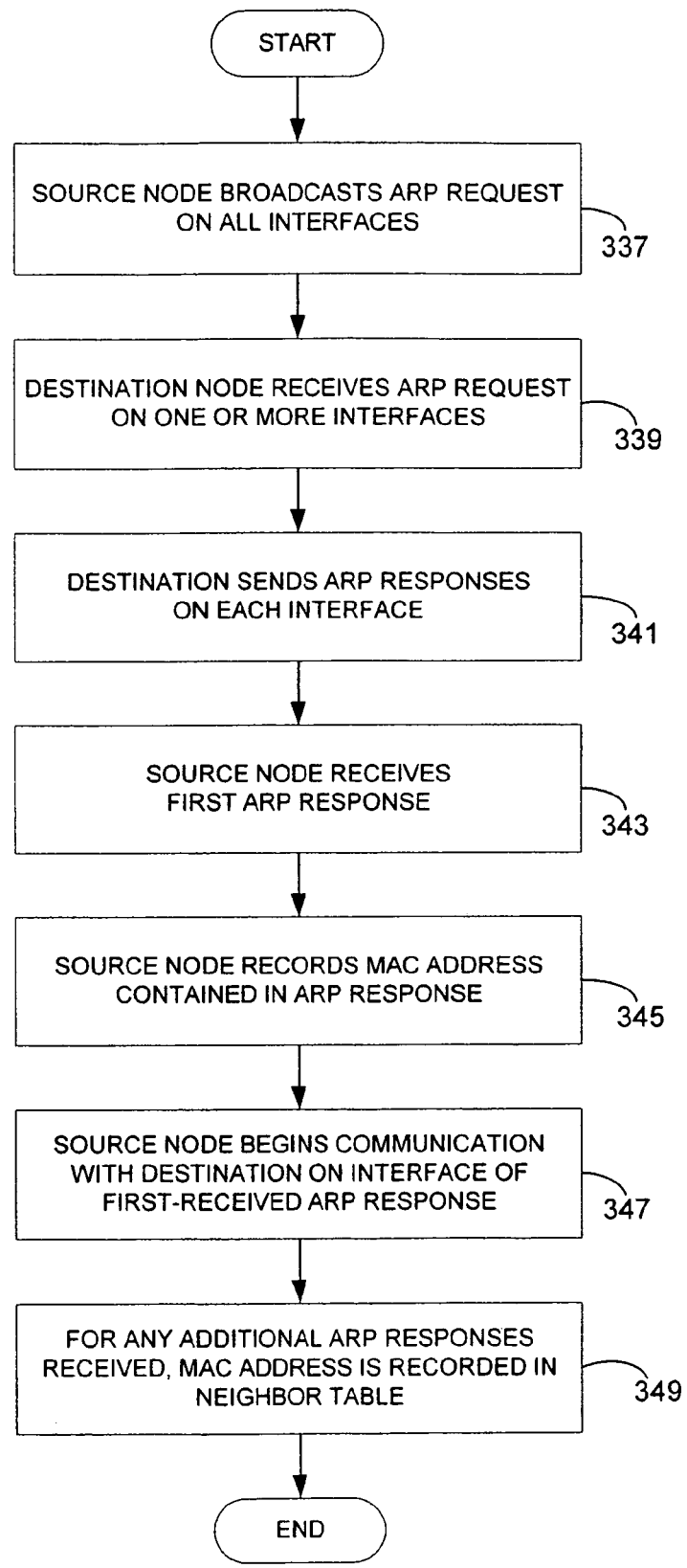
FIG. 5 is a flow diagram generally illustrating steps taken by a wireless node with respect to initial communication with a neighbor in accordance with an embodiment of the invention.

When a MUP-enabled node first initiates communication with a neighboring node, it does not assume that the neighbor is MUP-capable. Communication with a particular neighbor is therefore initiated, by an element 319 of the invention depicted in the block diagram of FIG. 3, using the known Address Resolution Protocol (ARP). This ensures that MUP-enabled nodes behave properly when communicating with legacy nodes that do not support MUP, and it allows the available network interfaces of the neighbor to be discovered. The steps associated with an embodiment of this discovery aspect of the invention are illustrated in FIG. 5. An ARP request is broadcast over all wireless interfaces (step 337). When the destination neighbor node receives an ARP request on an interface (step 339), it sends out an ARP response along that interface (step 341). The ARP response contains the MAC address corresponding to the network interface on which the neighbor received the ARP request. An incoming ARP response received by the originating node (step 343) passes through the node's MUP layer. MAC address information in an incoming ARP response is recorded in the neighbor table (step 345). Once the originating node receives an ARP response from the destination neighbor node, it can begin communicating with the neighbor along the interface on which the response was received (step 347). If any additional ARP responses are subsequently received, the additional MAC addresses contained in those responses are recorded in the neighbor table (step 349).

Figure 6:
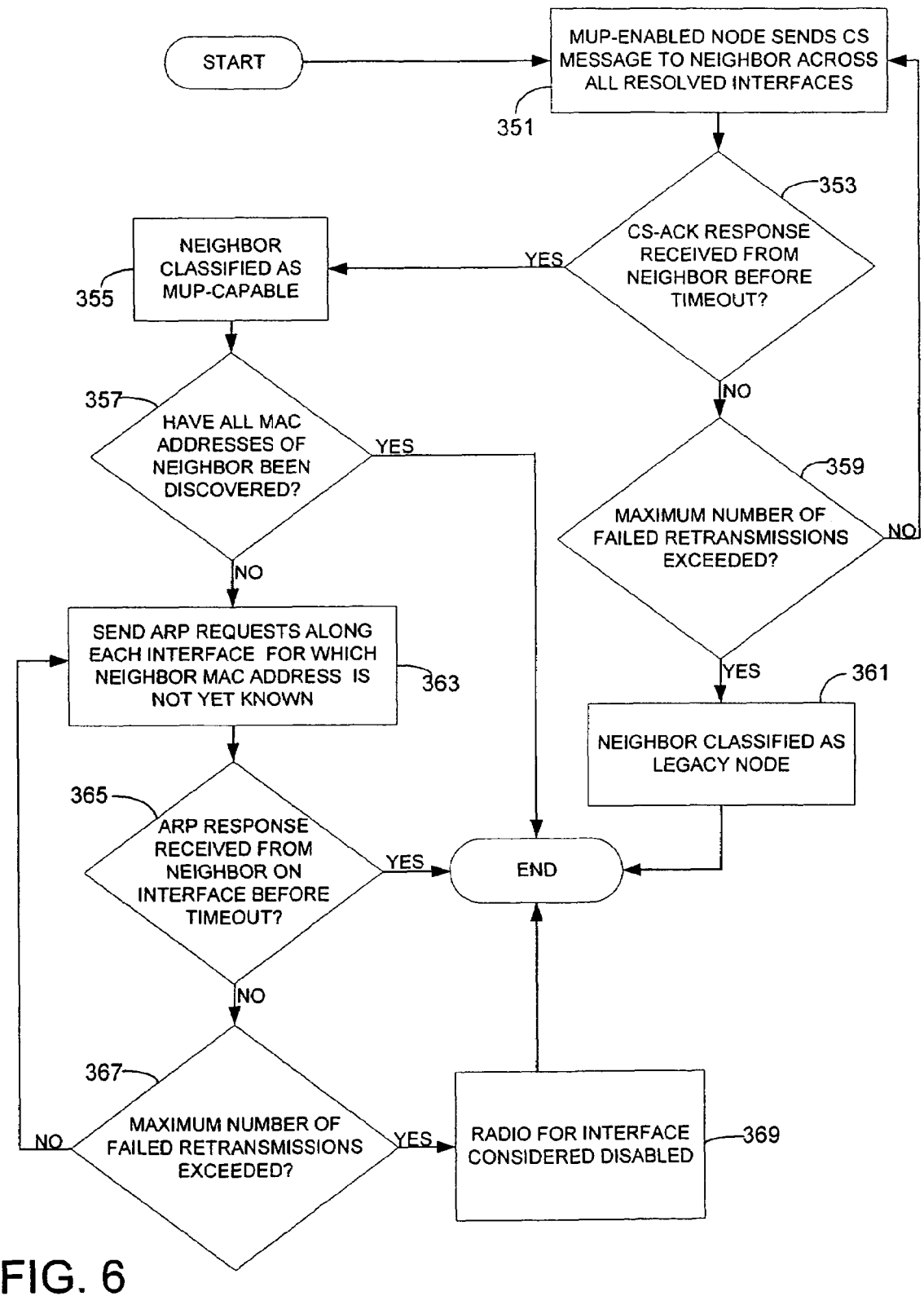
FIG. 6 is a flow diagram illustrating steps taken by a wireless node with respect to classification of a neighbor in accordance with an embodiment of the invention.

In an embodiment of the invention, after the initial ARP phase, a MUP-enabled node seeking to communicate with a given neighbor also initiates a classification process to determine whether the neighbor is MUP-enabled. The process is illustrated in the flow diagram of FIG. 6. A CS (Channel Select) message is sent across all resolved interfaces (step 351). If the neighbor is MUP-enabled, it will respond with a CS-ACK (Channel Select Acknowledgment) message and is thus classified when the CS-ACK is received (step 355). A timeout mechanism is used to retransmit CS messages if necessary (step 353). After a certain number of failed retransmissions (step 359), the neighboring node is classified as a legacy node (step 361).

An entry for a particular neighbor node in the neighbor table is deleted if no traffic is exchanged with the neighbor for a certain period of time. When the next communication is initiated with this neighbor, the discovery and classification process is begun again.

When a neighbor is determined to be MUP-enabled, but not all of the neighbor's MAC addresses have been discovered (step 357), there is an explicit attempt to resolve the MAC addresses on the remaining channels of the neighbor. The originating node sends ARP requests along each of its available channels with respect to which the neighbor node's corresponding MAC addresses are not yet known (step 363). A timeout mechanism is used for retransmitting ARP requests (step 365). After a fixed number of failed retransmissions (step 367), the particular radio with respect to which the timeout occurred is considered disabled for purposes of communication with this neighbor (step 369).

In accordance with the invention, a wireless network node equipped with multiple radios and supporting the multi-radio unification protocol attempts to make locally optimal decisions regarding which channel to use for communicating with one of its neighbor nodes. The decisions are based on current conditions known to the node regarding each of the channels that potentially can be used to send a packet to a particular neighbor. It has been shown that finding a globally optimal solution to the problem of channel selection is likely to be NP-complete. Moreover, there are no known practical approximation algorithms for the globally optimal channel selection problem.

In certain embodiments of the invention, locally optimal channel selection for communication with a particular neighbor is based on estimates of the current network load on each available and potentially usable channel for communicating with that neighbor. In one embodiment, channel load is estimated using a round-trip time metric. A node periodically sends probe messages to each neighbor with which it wishes to communicate, if that neighbor is known to operate in accordance with the multi-radio unification protocol. Probe messages are sent along each network interface available for communicating with the neighbor in order to measure the current round-trip time. The probe sending and receiving process may be performed by a distinct channel quality component of the invention, as depicted in FIG. 3 in the block 313. It should be understood that the invention is applicable to other methods of gaining an indication of the channel with the lightest load. Moreover, the invention is applicable to other, non-load-based channel quality metrics. For example, it might be desirable to select the link with the lowest packet loss rate, which is likely to be independent of the load on the channel.

Figure 7:
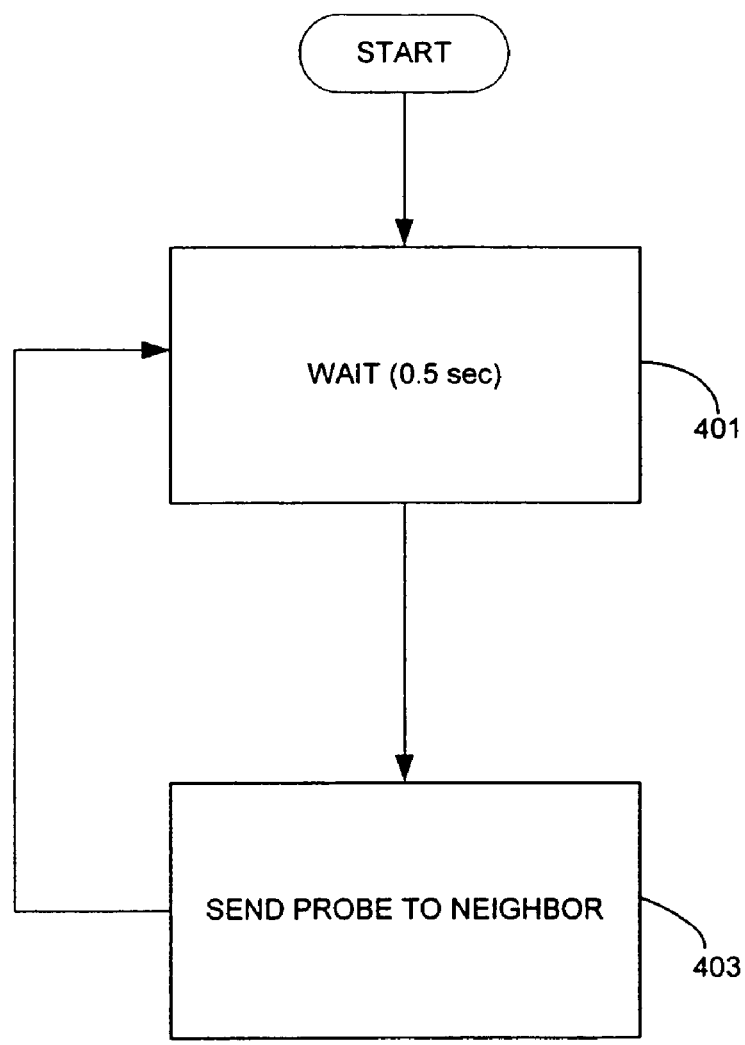
FIG. 7 is a flow diagram illustrating steps taken by a wireless node with respect to sending probe messages to a neighbor in accordance with an embodiment of the invention.

The flowchart of FIG. 7 shows the steps taken in sending out probe messages with respect to one neighbor and one network interface available for communicating with that neighbor. At step 401, the node waits for a fixed period of time (half a second in the embodiment illustrated in FIG. 7) and then sends a probe message to the neighbor along a particular available channel at step 403. After the probe is sent, the node returns to step 401 to wait for a probe response, the process beginning again. This process is performed for each channel that is available for communicating with a neighbor, for each neighbor. In an embodiment, the probe messages directed to a particular neighbor are not sent out at the same time. Instead, a randomization delay is used in determining when to send a probe message for a particular neighbor and channel.

The choice of a probe wait time parameter is based on a number of considerations. The more frequently the source node sends out probe packets on a particular channel, the more load the node is generating on that channel purely from engaging in the measurement of load conditions. On the other hand, the more frequently the probe packets are sent out, the better adjustment that can be made to short-term changes in existing conditions on the channel.

In an embodiment of the invention, a priority mechanism is employed to ensure that probe packets are transmitted on the given channel ahead of all other packets waiting in the transmission queue of the sending node. Such a priority mechanism can be provided, for example, by using NICs compliant with the IEEE 802.11e standard.

Round-trip measurement involves determining the length of time it takes for a neighbor node to receive a probe message and pass back a response. Probe messages sent along a heavily-loaded channel are likely to take longer to gain access to the medium of the neighbor than probes sent on a lightly-used channel.

Figure 8:
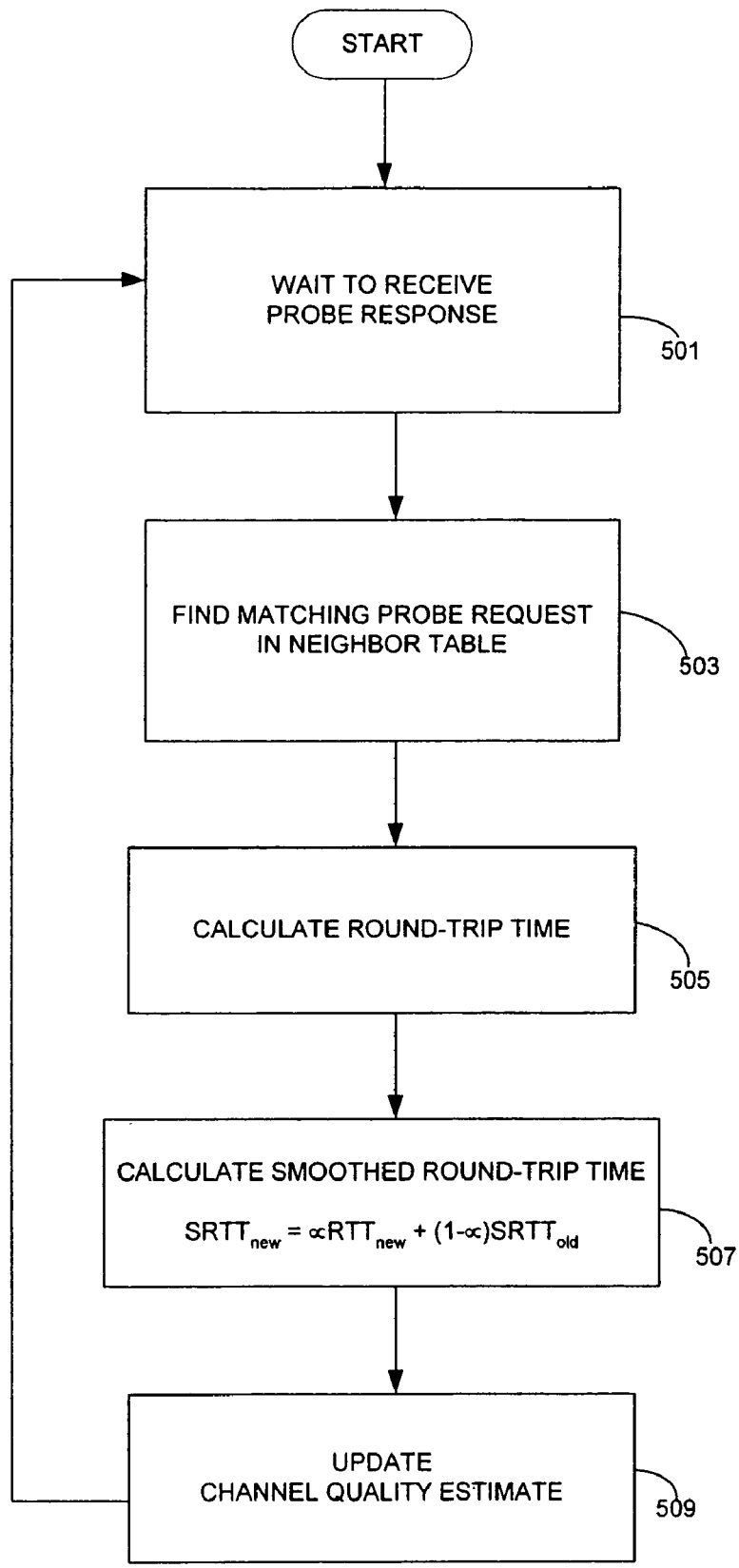
FIG. 8 is a flow diagram illustrating steps taken by a wireless node with respect to receiving probe responses and updating channel quality estimates in accordance with an embodiment of the invention.

The flowchart of FIG. 8 illustrates the steps taken in the receiving of probe responses from a neighbor. The node waits until it receives a probe response (step 501). It consults its neighbor table to find the corresponding probe request (step 503), indicated in one embodiment by matching sequence numbers. The node uses this information to determine the round-trip time for the probe (step 505). At step 507 the node calculates an exponentially-weighted average called a smoothed round-trip time (SRTT) according to the following formula:

$$SRTT_{new} = \alpha RTT_{new} + (1-\alpha)SRTT_{old}$$

In this formula, $RTT_{new}$ is the most recent round-trip time measurement for the given neighbor and channel, and $\alpha$ is a parametric constant that controls the shape of the exponentially-weighted average. A large $\alpha$ value will add more weight to the most recent measurement. A smaller $\alpha$ value will add more weight to the previous estimate of the weighted round-trip time (denoted in the formula $SRTT_{old}$). The SRTT is used to increase the stability of channel-selection decisions over time. At step 509 the node updates the neighbor table, using the new SRTT as the new channel quality estimate for the given channel. The node then loops back to step 501, resuming its wait for probe responses.

Figure 9:
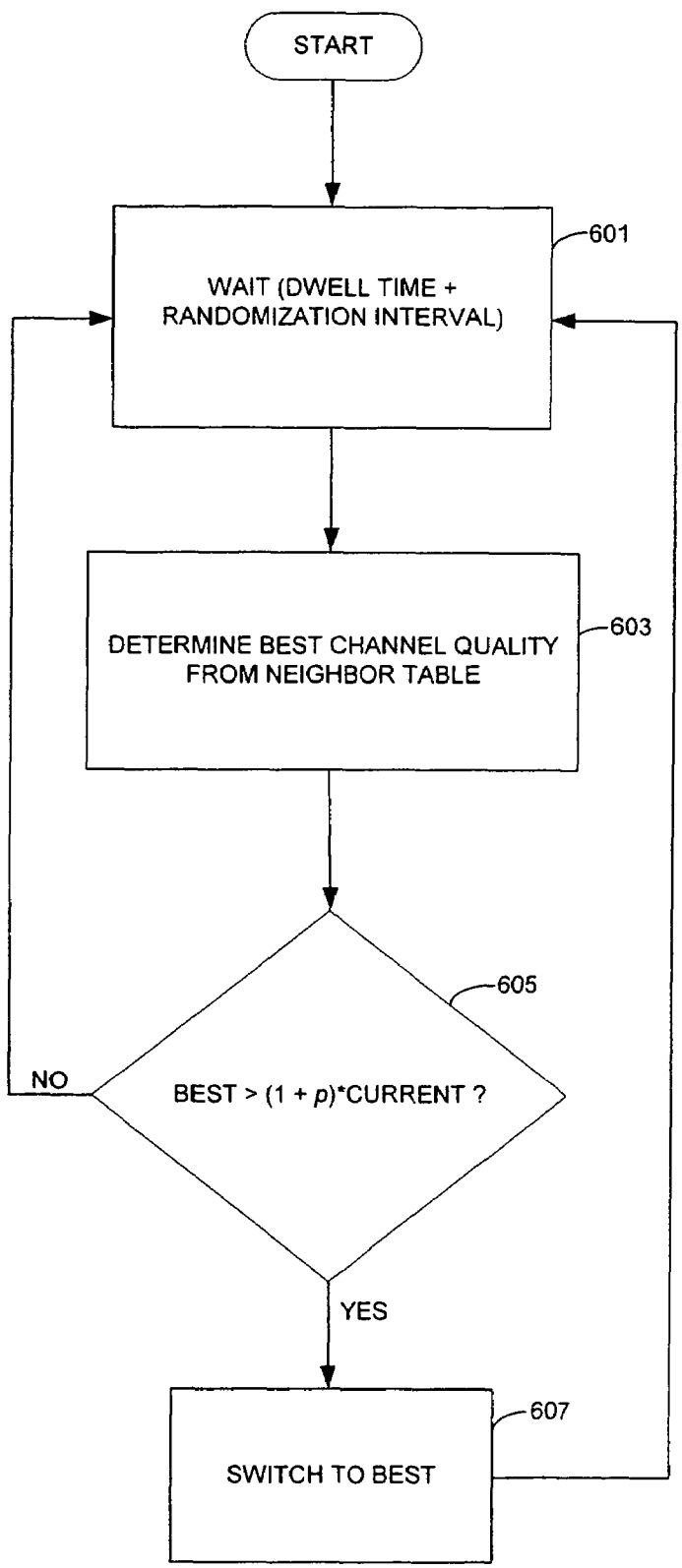
FIG. 9 is a flow diagram illustrating steps taken by a wireless node with respect to a channel selection decision in accordance with an embodiment of the invention.

The flowchart of FIG. 9 illustrates how channel selection is handled in an embodiment of the invention. Each outgoing packet is sent along the channel that is currently selected for communicating with the destination node. At randomized intervals a decision is made regarding which channel to use when communicating with the neighbor.

Once the channel selection decision is made, it will be maintained for a certain period of time. Several damping mechanisms (in addition to the use of the SRTT instead of actual current round-trip time) are used in an embodiment of the invention to control channel switching, in part to avoid oscillating channel-switching behavior among a set of neighbor nodes. In FIG. 9, at step 601 the node waits for a period of time comprising a fixed minimum dwell time and an additional randomization interval. The randomization interval ensures that several nodes within range of one another will not all perform the switching decision at the same time. At step 603 the neighbor table is consulted and the channel with the best quality (in an embodiment, the channel with the lowest SRTT estimate) is determined.

At step 605 an improvement threshold is used in determining whether to switch to the best quality channel. Here the threshold is designated as the parameter p. For example, it might be required that the SRTT of the best quality channel be 20 percent shorter than the SRTT of the channel currently being used to communicate with the given neighbor node. If the improvement is not above the threshold, the current channel is maintained, and the procedure returns to step 601. If the improvement is above the threshold, the node switches to the best quality channel in step 607 and the procedure returns to step 601.

In an embodiment of the invention, the multi-radio unification protocol and its associated mechanisms and procedures can be intelligently combined with striping of network traffic across multiple network interfaces per node. In this embodiment, striping algorithms take into account the differing qualities of available channels.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and is not a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled practitioners to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. In a wireless network comprising a plurality of nodes, a method for selecting, by a first node, a channel for communicating with a second node, the first node having at least two network interfaces with radios tuned to orthogonal channels, the method comprising:

the first node discovering network interfaces of the second node available for communicating with the first node, wherein the first and second nodes are neighbor nodes in a multi-hop ad hoc wireless network and communicate directly without communicating through an access point;

with respect to each available network interface of the second node, the first node periodically making a channel quality estimate; and the first node making a channel selection based on the channel quality estimates, wherein making a channel selection comprises:

if a first network interface of the second node has a channel quality estimate that is preferable to channel quality estimates of other network interfaces of the second node, and if the channel quality estimate of the first network interface provides an improvement, above a threshold, over the channel quality estimate of a currently-selected network interface of the second node, selecting the first network interface; and otherwise retaining the currently-selected network interface.

2. The method of claim 1 wherein discovering available network interfaces is in accordance with a protocol, and wherein discovering available network interfaces further comprises discovering whether the second node is capable of operating in accordance with the protocol.

3. The method of claim 1 wherein making a channel quality estimate comprises:

sending a probe message along the network interface;

receiving a response to the probe message from the second node; and calculating a round-trip latency time associated with sending the probe message and receiving the response.

4. The method of claim 3, wherein the probe message is assigned a highest scheduling priority level so that the probe message may be transmitted ahead of other packets.

5. The method of claim 4, wherein the network interface is conformant to IEEE standard 802.11e.

6. The method of claim 1 wherein making a channel selection is performed at a time determined by a randomized interval.

7. The method of claim 1 wherein making a channel selection comprises selecting a channel associated with a network interface of the second node having a best channel quality estimate.

8. The method of claim 1, further comprising:

making at least one additional channel selection, wherein communicating with the second node comprises striping data among selected channels.

9. The method of claim 1 wherein communicating with the second node comprises forwarding a packet received from a third node.

10. The method of claim 1 wherein the wireless network is a multi-hop network, an ad hoc network, an infrastructure network or a wireless community network.

11. The method of claim 1 wherein the wireless network is linked to a second network.

12. The method of claim 11 wherein the second network is a wired network.

13. The method of claim 11 wherein the second network is a wide-area network.

14. The method of claim 1 wherein one or more network interfaces in the wireless network conform to IEEE standard 802.11, IEEE standard 802.11a, IEEE standard 802.11b, or IEEE standard 802.11g.

15. Computer-readable media storing one or more modules comprising a driver that implements a method for selecting a channel for wireless communication from a first device to a second device, the first device having at least two network interfaces comprising radios tuned to orthogonal channels, the method comprising:

the first device discovering available network interfaces of the second device, wherein the first and second devices are neighbor devices in a multi-hop ad hoc wireless network and communicate directly without communicating through an access point;

with respect to each available network interface of the second device, the first device periodically making a channel quality estimate; and the first device making a channel selection based on the channel quality estimates, wherein making a channel selection comprises:

if a first network interface of the second device has a channel quality estimate that is preferable to channel quality estimates of other network interfaces of the second device, and if the channel quality estimate of the first network interface provides an improvement, above a threshold, over the channel quality estimate of a currently-selected network interface of the second device, selecting the first network interface; and otherwise retaining the currently-selected network interface.

16. The computer-readable media of claim 15, wherein the driver is an operating system kernel-mode driver.

* * * * *